United States Patent
Beiley et al.

(10) Patent No.: US 7,024,565 B1
(45) Date of Patent: Apr. 4, 2006

(54) METHOD AND APPARATUS TO DETECT CIRCUIT TAMPERING

(75) Inventors: Mark A. Beiley, Chandler, AZ (US); James E. Breisch, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/466,234

(22) Filed: Dec. 17, 1999

(51) Int. Cl.
*H04L 9/32* (2006.01)
*G06F 12/14* (2006.01)
*G06F 11/30* (2006.01)
*G06F 11/00* (2006.01)
*G08B 23/00* (2006.01)

(52) U.S. Cl. ............ 713/194; 726/23; 726/35
(58) Field of Classification Search .......... 713/194
See application file for complete search history.

(56) References Cited

U.S. PATENT DOCUMENTS 4,353,056 A * 10/1982 Tsikos ............ 382/124
5,389,738 A * 2/1995 Piosenka et al. ...... 174/52.4

* cited by examiner

*Primary Examiner*—Gilberto Barrón, Jr.
*Assistant Examiner*—Cas Stulberger
(74) *Attorney, Agent, or Firm*—Blakely, Sokoloff, Taylor & Zafman LLP

(57) ABSTRACT

A circuit includes a capacitor formed with a dielectric including the dielectric encasing elements of the circuit. A detector detects changes in the capacitance of the capacitor.

7 Claims, 2 Drawing Sheets

METHOD AND APPARATUS TO DETECT CIRCUIT TAMPERING

BACKGROUND

1. Field

The present invention relates to the detection of tampering with electronic circuits.

2. Background Information

An electronic circuit may be subjected to tampering by third parties attempting to ascertain internal operations of the circuit. For example, the circuit may perform an encryption operation on data using a secret value known as a key. It may be difficult for third parties to ascertain the key value by simply examining the input and output signals to the circuit. By tampering with the circuit, these parties may gain insight into the value of the key employed in the encryption operation.

One form of tampering involves using chemicals or mechanical processes to strip away materials in which the circuits are encased. Such material may include "passivation material", e.g. a form of dielectric or insulator, and may be stripped using chemicals to expose conductive elements of the circuits. Probes may then be placed on the conductive elements to measure signals produced by internal operations of the circuit. The measurements may allow a third party to ascertain information about the internal operation of the circuit.

SUMMARY

A circuit includes a capacitor formed with a dielectric including the dielectric encasing elements of the circuit. A detector detects changes in the capacitance of the capacitor.

BRIEF DESCRIPTION OF THE DRAWINGS

The subject matter regarded as the invention is particularly pointed out and distinctly claimed in the concluding portion of the specification. The invention, however, may be further understood by reference to the following detailed description read with reference to the accompanying drawings.

DETAILED DESCRIPTION

Figure 1:
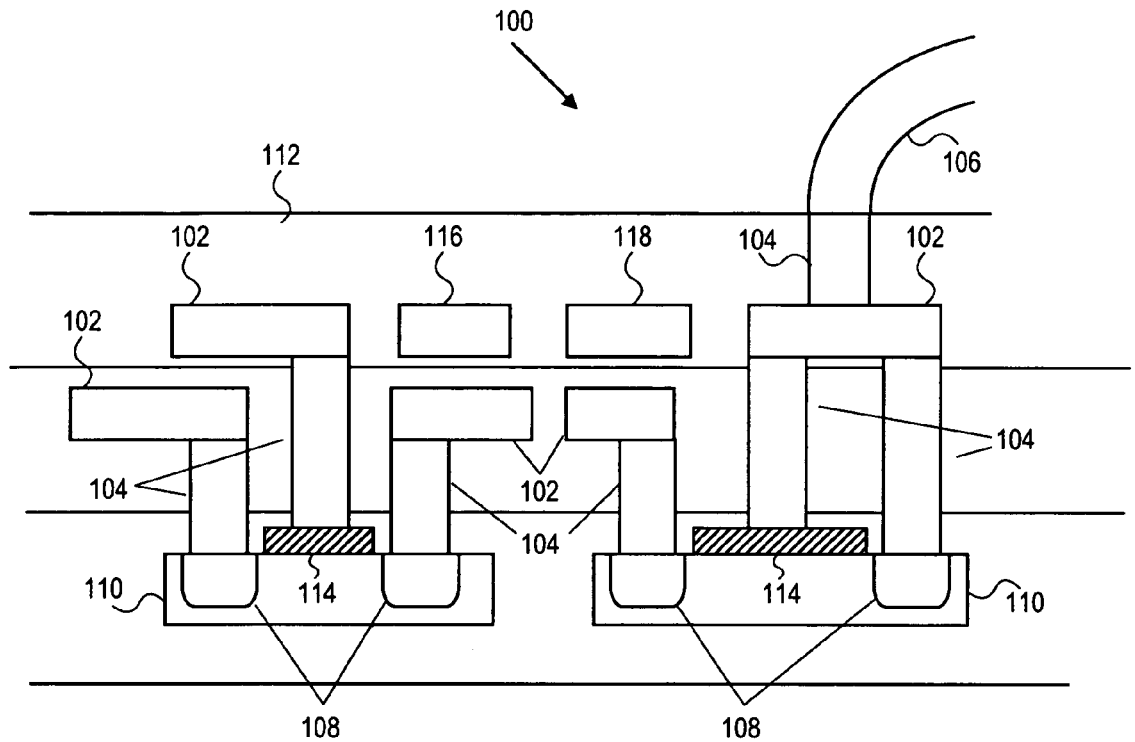
FIG. 1 shows an embodiment of a circuit in accordance with the present invention.

FIG. 1 shows an embodiment 100 of a circuit in accordance with the present invention. Embodiment 100 comprises doped regions 110 including doped sub-regions 108. For example, doped regions 110 may be produced using N-type silicon doping and sup-regions 108, also known as "diffusion regions" within regions 110, may be created using P-type silicon doping. Oxide regions 114 may be formed over portions of regions 110 to act as gates. In manners well known in the art, a voltage and/or current signal may be applied to regions 114 to facilitate the exchange of electrons between the regions 108 within a region 110. In other words, regions 110, 114, and 108 may act as a gate-controlled solid state transistor.

A voltage and/or current signal may be provided to regions of the solid state transistors by way of vias 104. Vias 104 act to conduct electrical signals between different layers of circuit 100. Circuit 100 may be organized into layers. Each layer may comprise conductive signal paths 102 for routing electrical signals among various elements of the circuit. Signal paths 102 may be encased within a dielectric material 112, also known as a passivation material or insulator, which protects the signal paths 112 and circuit elements and prevents signals from leaking between various components of the circuit 100. A bonding wire 106 may be coupled to a signal path 102 by way of a via 104 and may conduct signals to and from a terminal of packaging comprising a circuit 100.

Figure 2:
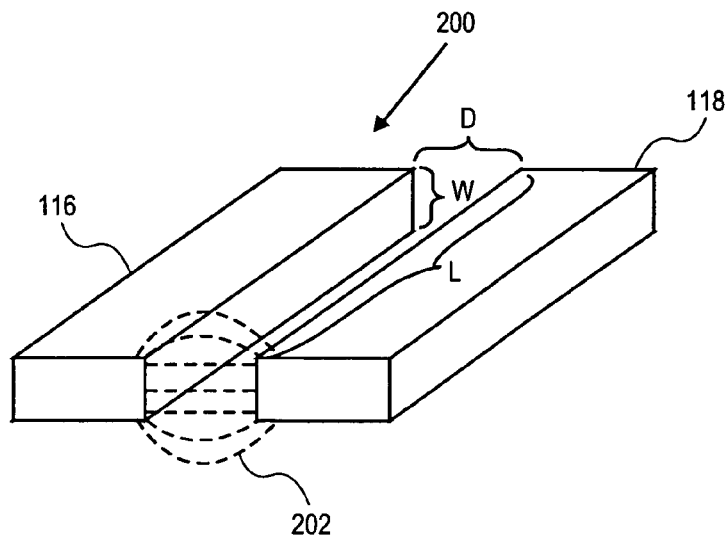
FIG. 2 shows an embodiment of conductive elements in accordance with the present invention.

Circuit 100 may further comprise conductive elements 116 and 118. Elements 116 and 118 may be arranged approximately parallel to certain signal paths 102 of the circuit 1100. FIG. 2 shows an embodiment 200 of conductive elements 116 and 118 in accordance with the present invention. Elements 116 and 118 are arranged proximate to one another and approximately parallel. Thus capacitive field 202 may be generated between the elements. A capacitance C resulting from this field 202 may be approximately determined by the following formula:

$$C = (\epsilon_0 * \epsilon_R * A) / D$$

Here D is a distance separating facing surfaces of elements 116 and 118 as shown in FIG. 2. The symbol A represents the area of the facing surfaces and may be calculated by multiplying the width W of a facing surface by the length L of the facing surface. The value $\epsilon_0$ is the well known dielectric constant of a vacuum and has an approximate value of $8.854 \times 10^{-14}$ F/cm. The value $\epsilon_R$ is the dielectric constant of the material occupying the space surrounding and between the two elements 116 and 118. For example, passivation material 112 may have $\epsilon_R$ of approximately 4, whereas air may have an $\epsilon_R$ value of approximately 1. The formula demonstrates that the capacitance C produced by the approximately parallel arrangement of conductive elements 116 and 118 is directly proportional to the dielectric constant of the material around and between the elements.

Of course, the capacitive field may extend between and around the circuit elements 116 and 118, and thus removal of dielectric material 112 from the vicinity (not just between and immediately around) of the elements 116 and 118 may affect the capacitance C.

Figure 3:
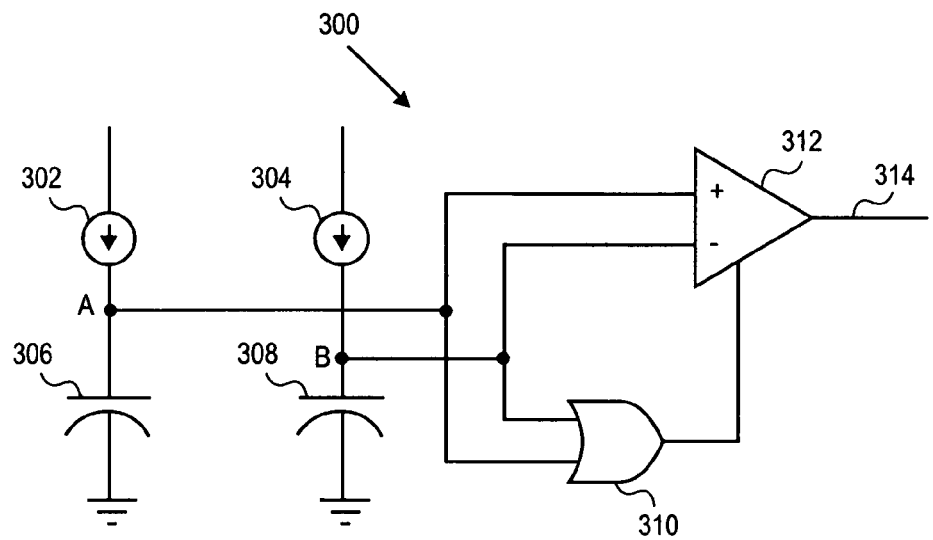
FIG. 3 shows an embodiment of a tamper detection circuit in accordance with the present invention.

FIG. 3 shows an embodiment 300 of a tamper detection circuit in accordance with the present invention. Circuit 300 includes two current sources, 302 and 304. In one embodiment, current sources 302 and 304 produce substantially identical, constant current through a range of load conditions. A reference capacitor 308 is provided which is coupled to current source 304. A voltage at node B will increase approximately linearly due to the application of constant current over time to reference capacitor 308. The rate at which the voltage at node B increases is determined by the capacitance of capacitor 308. A second capacitor 306 is coupled to current source 302.

In one embodiment, capacitor 306 is defined by conductive elements 116 and 118. A constant current applied to capacitor 306 by source 302 will increase a voltage at node A approximately linearly over time. The rate at which this voltage increases may be determined by the capacitance of capacitor 306. When either the voltage at node A or the voltage at node B exceeds a predetermined voltage level (logical "high"), OR gate 310 asserts an enable signal to comparator 312. Comparator 312 may be any device which may compare two input signal values to produce an output signal value indicating if one signal has a value less than the other, or alternately if one signal has a value greater than the other. In one embodiment, an output signal 314 of comparator 312 is asserted when the voltage on node A exceeds the voltage on node B. Output 314 is not asserted when the voltage level on node B exceeds the voltage level on node A. Asserted output 314 may be used to disable one or more operations of circuit 100.

Figure 4:
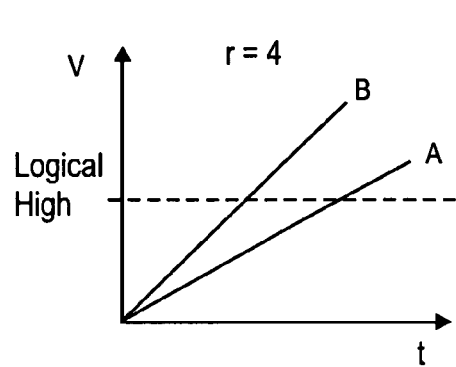
FIG. 4 shows an embodiment of voltage signals over time when passivation material is present on and between the conductive elements.

FIG. 4 shows an embodiment of voltage signals over time on nodes A and B when passivation material 112 is present on and between conductive elements 116 and 118 forming capacitor 306. When passivation material 112 is present, $\epsilon_R$ is approximately equal to a value of 4. This affects the capacitance of capacitor 306 in such a fashion that the voltage on node A increases at a slower rate than the voltage on node B. OR gate 310 asserts an enable signal to comparator 312 when the voltage at B exceeds logical high. At this point in time and thereafter, the voltage at node B exceeds the voltage at node A and the output of comparator 312 is not asserted. Such a condition indicates that passivation material 112 is present between and around the elements of capacitor 306.

Figure 5:
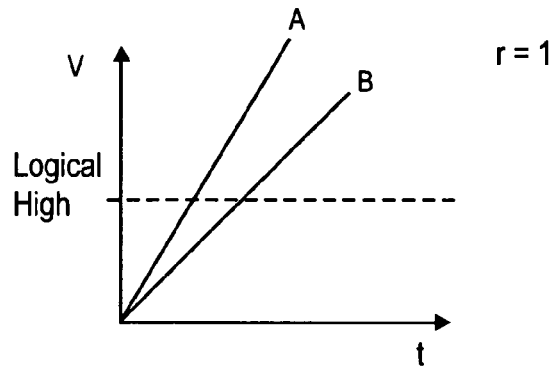
FIG. 5 shows an embodiment of voltage over time when passivation material has been stripped from between and/or around the conductive elements.

FIG. 5 shows an embodiment of voltage over time when passivation material 112 has been stripped from between and/or around the elements 116 and 118 of capacitor 306. Note that not all passivation material 112 may be removed. Rather, portions of passivation material 112 may be removed from around and/or between the elements 116 and 118 of capacitor 306. This may occur as a result of physical tampering with circuit 100 in an attempt to access internal components. When the voltage level on node A exceeds logical high, OR gate 310 enables comparator 312. Voltage at node A exceeds the voltage at node B which causes comparator to assert its output signal 314. This condition indicates that passivation material 112 has been removed from around and/or between elements 116 and 118. This condition may indicate tampering. Signal 314 may be employed to disable one or more circuit operations and thus prevent a party responsible for the tampering from obtaining information about internal operations of the circuit.

Elements 116 and 118 may be positioned within circuit 100 such that it may be difficult for a party tampering with the circuit 100 to access important internal components without removing passivation material 112 from around or between elements 116 and 118. Removal of passivation material 112 may result in assertion of tamper detect signal 314, disabling one or more circuit operations.

Once application of the present invention may be found in processor circuits. A computer system may comprise a processor and a memory coupled to the processor by way of a bus. The memory may store instruction signals which, when executed by the processor, may result in the computer system carrying out certain operations such as reading input signals and producing output signals by way of peripheral devices. The processor may encrypt output signals or decrypt input signals from said peripheral devices. The present invention may be employed to prevent parties from tampering with the processor circuit to determine characteristics of the encryption or decryption operation.

While certain features of the invention have been illustrated as described herein, many modifications, substitutions, changes and equivalents will now occur to those skilled in the art. It is, therefore, to be understood that the appended claims are intended to cover all such embodiments and changes as fall within the true spirit of the invention.

What is claimed is:

1. A circuit comprising:
   a first capacitor formed with a dielectric including the dielectric encasing elements of the circuit;
   a detector to detect changes in the capacitance of the capacitor, wherein the capacitance changes due to removal of dielectric material;
   approximately parallel conductors located proximate to circuit elements to protect from tampering; and
   a comparator to compare a reference voltage with a voltage at a node of the first capacitor, wherein the reference voltage is a voltage at a node of a second capacitor.

2. The circuit of claim 1 in which the detector further comprises:
   a disable output terminal to provide a signal to disable an operation of the circuit.

3. A circuit comprising:
   a detector comprising a first capacitor formed from conductive elements arranged such that removal of dielectric material from the vicinity of the conductive elements results in assertion of a signal disabling one or more operations of the circuit, the conductive elements arranged approximately parallel and proximate to elements of the circuit to protect from tampering; and
   a comparator to compare a reference voltage with a voltage at a node of the first capacitor, wherein the reference voltage is a voltage at a node of a second capacitor.

4. The circuit of claim 3, the detector adapted to assert the signal as a result of a change in a capacitance of the first capacitor.

5. A method comprising:
   disabling one or more operations of a circuit upon detecting a change in a capacitance resulting from removal of dielectric material from the vicinity of conductive elements of the circuit, the change in capacitance resulting from removal of dielectric material from the vicinity of approximately parallel conductors located proximate to circuit elements to protect from tampering;
   forming a first capacitor using approximately parallel conductors located proximate to circuit elements to protect from tampering; and
   comparing a reference voltage with a voltage at a node of the first capacitor, wherein the reference voltage is a voltage at a node of a second capacitor.

6. A computer system comprising:
   a processor coupled to a memory by way of a bus;
   the processor comprising a detector, the detector comprising a first capacitor formed from conductive elements arranged such that removal of dielectric material from the vicinity of the conductive elements results in assertion of a signal disabling one or more operations of the circuit, the conductive elements arranged approximately parallel and proximate to elements of the processor to protect from tampering; and a comparator to compare a reference voltage with a voltage at a node of the capacitor, wherein the reference voltage is a voltage at a node of a second capacitor.

7. The system of claim 6, the detector adapted to assert the signal as a result of a change in a capacitance of the first capacitor.

* * * * *